United States Patent
Banas, Sr.

[11] 3,885,314
[45] May 27, 1975

[54] TWO-WAY TAPE AND CENTERING DEVICE

[76] Inventor: Andrew J. Banas, Sr., 250 Taraval St., San Francisco, Calif. 94116

[22] Filed: Dec. 6, 1973

[21] Appl. No.: 422,291

[52] U.S. Cl. .................. 33/27 C; 33/138; 33/191
[51] Int. Cl. .................. B43l 9/04; G01b 3/10
[58] Field of Search .......... 33/27 C, 189, 191, 138, 33/137, 139, 140, 174 F

[56] References Cited
UNITED STATES PATENTS

| | | | |
|---|---|---|---|
| 1,187,658 | 6/1916 | Sauerhering | 33/191 |
| 2,230,668 | 2/1941 | Ohrtmann | 33/138 |
| 2,840,914 | 7/1958 | Buckelew | 33/138 X |
| 3,025,608 | 3/1962 | Hendrix | 33/191 |
| 3,192,630 | 7/1965 | Dineson | 33/137 R |
| 3,269,015 | 8/1966 | Barker | 33/27 C |
| 3,376,648 | 4/1968 | Ljungberg | 33/138 |
| 3,514,863 | 6/1970 | Mull | 33/138 |

FOREIGN PATENTS OR APPLICATIONS
619,269 9/1935 Germany .................. 33/138

*Primary Examiner*—Harry N. Haroian
*Attorney, Agent, or Firm*—Townsend and Townsend

[57] ABSTRACT

A two-way measuring and centering device is disclosed. The device includes first and second tape measures extensible in opposite directions. The tape measures are located in separate compartments of a single housing. An inscribing device projects through the housing between the first and second tape measures. The inscribing device includes an elongate shaft having a flat end adapted to be struck with a hammer or otherwise depressed and an opposite pointed end for inscribing a mark when the shaft is struck. Spring bias means are provided for maintaining the shaft in a raised position with the tip enclosed in the housing until the shaft is depressed.

5 Claims, 4 Drawing Figures

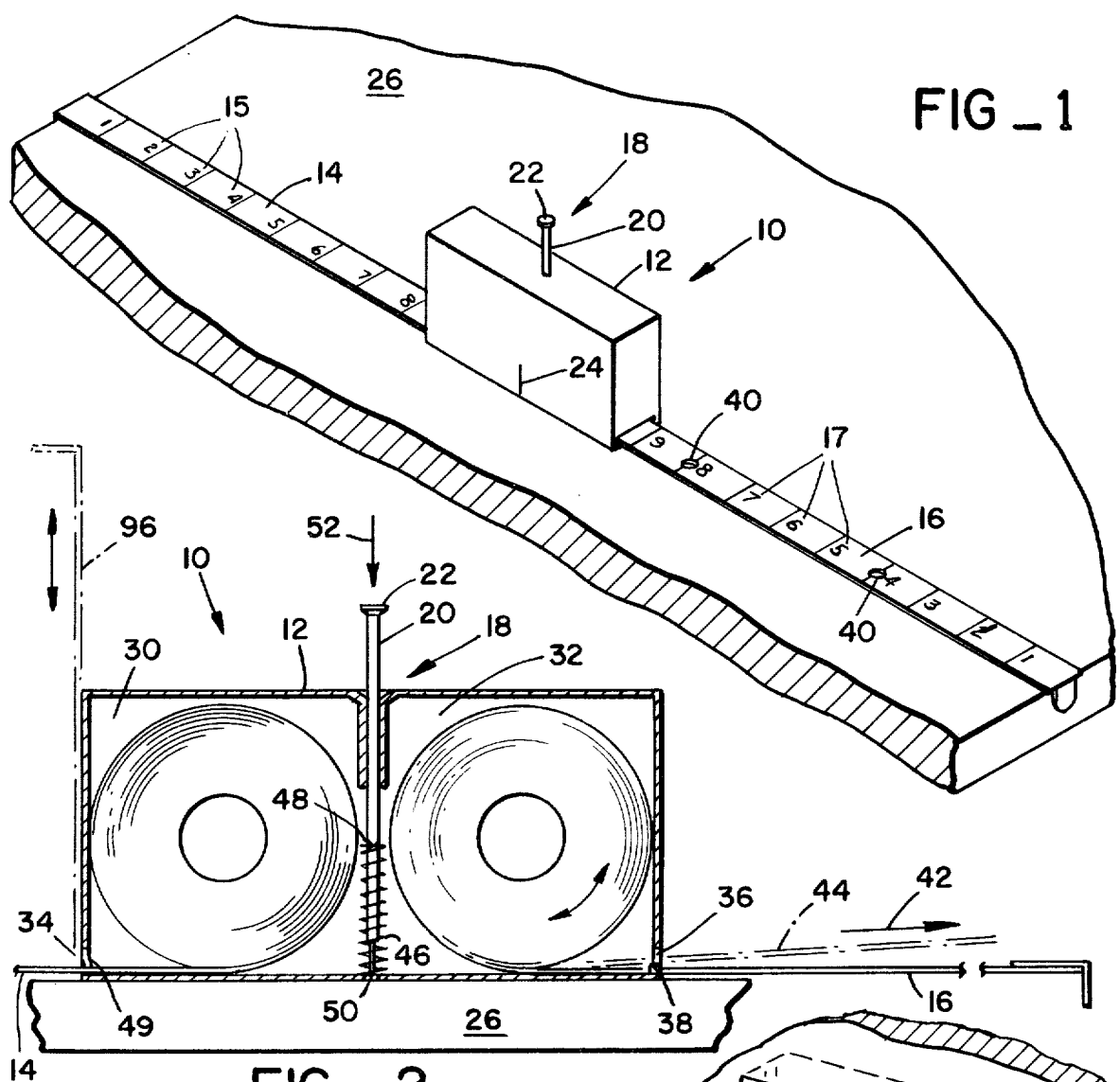
FIG_1
FIG_2
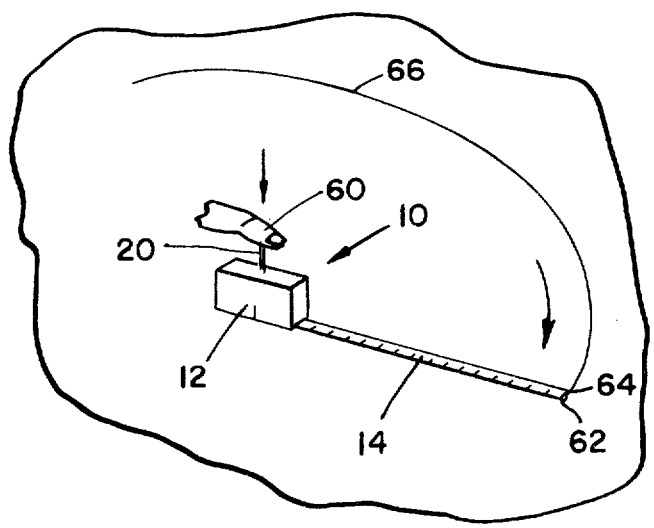
FIG_3
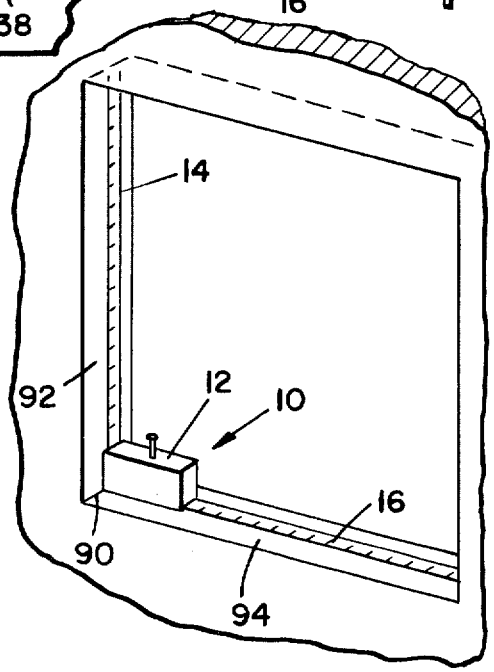
FIG_4

TWO-WAY TAPE AND CENTERING DEVICE

BACKGROUND OF THE INVENTION

The present invention relates to tape measure devices, and in particular to a two-way tape measuring and centering device.

Tape measures which employ two separate tapes are known in the art, as illustrated by the patent to Ohrtmann, U.S. Pat. No. 2,220,668. In fact, tape measures employing three orthogonal tapes have been derived for special purposes, as illustrated by the patent to Green, U.S. Pat. No. 3,459,429. However, devices of this type which are known in the art have two failings. First, the tape cannot be used as a centering apparatus since there is no convenient way to mark the center of the device. Second, when a relatively long item is to be measured, a person using the device has difficulty in maintaining both of the tapes extended since the ends of the tapes slip off the item and they tend to retract into the housing. As a result of these and other problems, such measuring devices are not now in common usage.

The present invention provides a two-way tape measuring and centering device. First and second tape measure means are provided which are extensible in opposite directions. Inscribing means are located intermediate the first and second tape measure means. The inscribed means includes an elongate shaft having a first pointed end and a second opposite generally flat end so that the shaft can be struck on the flat end to inscribe a mark with the pointed end.

The two-way tape measure and centering device of the present invention is adapted to solve problems inherent in previous devices of this type. An inscribing apparatus is provided which allows a centering mark to be conveniently and accurately made. In the preferred embodiments of the present invention, the inscribing apparatus includes spring bias means which maintain the shaft in a raised position with the tip enclosed in the housing of the device until the shaft is depressed. Hence, the apparatus of the present invention can be conveniently and safely carried in the pocket of the user but is capable of making an accurate and readable mark when desired.

The inscribing means can also be used to provide a pivot point for the device, and the device can be rotated about this pivot point. One or both of the tapes can be extended, and a marking point attached to the end thereof, so that the apparatus can be used as a compass to inscribe a circular arc.

Preferred embodiments of the present invention provide different types of locking means for the two tape measures. One of the tapes is preferably provided with a plurality of apertures spaced along its length, and the housing of the device has a peg engageable with these apertures. The apertured tape can be extended a given length and firmly fixed at that length by engaging an aperture with the peg so that the tape will not slip off the end of the item, and the other end can be used to make an accurate measure. In this manner, a relatively long item can be conveniently and accurately measured by a single person. The other tape can be provided with a different type of lock such as a friction lock.

In the preferred embodiment of the present invention, the numerals and indicia on both of the tapes face in a common direction. Tape measures are commonly constructed with the numbers and indicia aligned for right-handed users so that they are upside-down for left-handed persons. The tapes of the present invention can be used singly with one tape designed for left-handed users and the other for right-handed users.

The novel features which are characteristic of the invention, as to organization and method of operation, together with further objects and advantages thereof will be better understood from the following description considered in connection with the accompanied drawings which a preferred embodiment of the invention is illustrated by way of example. It is to be expressly understood however, that the drawings are for the purpose of illustration and description only and are not intended as a definition of the limits of the invention.

BRIEF DESCRIPTION OF THE DRAWINGS

FIG. 1 is a perspective view of a preferred embodiment of the present invention utilized as a centering device;

FIG. 2 is a side sectional elevation view of the embodiment of FIG. 1, illustrating the use of the present invention in measuring both planar and non-planar surfaces;

FIG. 3 is a perspective view illustrating the use of the present invention to inscribe an arc;

FIG. 4 is a prospective view of the present invention utilized to measure two orthogonal surfaces.

DESCRIPTION OF THE PREFERRED EMBODIMENT

The use of the present invention as a centering device is illustrated by way of reference to the perspective view of FIG. 1. The apparatus 10 includes a housing 12, and a first and second tape measure 14, 16 extensible from the housing in opposite directions. Numerals 15, 17 on tapes 14, 16 face in a common direction as shown. Apparatus 10 includes an inscribing device illustrated generally at 18, which comprises a shaft 20 projecting upwardly out of housing 12. Shaft 20 has an upper end 22 which is preferably flat and adapted to be struck with a hammer or depressed with a finger for inscribing a mark as will be illustrated hereinafter. Also, housing 12 is provided with reference indicia 24 indicating the exact center of the housing, and this reference indicia can be used as an alternate centering indicator.

The apparatus 10 illustrated in FIG. 1 is used as the centering device in the following manner. First, one of the tapes 14 is extended and hooked over the edge of the item 26 upon which a centering mark is to be placed. Then the second tape 16 is extended in the opposite direction and hooked over the other end of item 26. Neither of the tapes 14, 16 is locked in position in any manner. Housing 12 is then moved back and forth along tapes 14, 16 until the measurement readings 15, 17 on each of the tapes is identical, indicating centering of the housing 12. Shaft 20 can be struck on its flat end 22 with a hammer, thumb, etc., to inscribe a centering mark. Also, shaft 20 can be withdrawn from housing 12, and can be manually used to inscribe a mark at indicia 24. Either of these methods provides a means for obtaining an accurate center of item 26. Either in or out of the housing, shaft 20 can be used to scratch a mark in the surface without forming a punched depression.

The construction of the apparatus of the present invention is illustrated in more detail by way of reference to the sectional view of FIG. 2. Housing 12 of apparatus 10 is divided into compartments 30, 32. Tape 14 is located in compartment 30, and tape 16 in compartment 32, and the respective compartments are mutually aligned so that the tapes are extensible in opposite directions. Each of the tapes is formed into a roll inside the housing as illustrated, and the tapes are spring biased to draw the tapes into the housing as known in the art.

Tapes 14, 16 pass out of housing 12 through oppositely directed openings 34, 36 in the respective chamber 30, 32. Opening 36 has an upwardly extending peg 38. Tape 16 is provided with a plurality of apertures 40 placed at 4 inch centres (see FIG. 1). When tape 16 is drawn from chamber 32 as illustrated by arrow 42, it is slightly upwardly inclined as illustrated by phantom 44 so as to ride over peg 38. When tape 16 has been extended to the appropriate length, one of the apertures 40 can be engaged by peg 38 to fix the tape in position. The other tape 14 is not provided with apertures, but can be provided with other locking mechanisms known in the art, such as a friction lock. A friction lock is shown in opening 34, wherein the sides 49 thereof are serrated and inwardly inclined to capture tape 14 when it is snapped downwardly, as shown. With tape 16 fixed at a selected length, tape 14 can be used for accurate measure of long objects.

The inscribing apparatus 18 of the present invention is illustrated in more detail by way of reference to FIG. 2. Shaft 20 passes through housing 12, intermediate chambers 30 and 32. Flat end 22 of shaft 20 is spaced from housing 12. Shaft 20 is normally maintained in this position by means of a spring 46 circumscribing shaft 20. Spring 46 is confined between a notch 48 on shaft 20 and the lower edge of housing 12. In this raised position, the pointed end 50 of shaft 20 is sheathed within housing 12.

When a mark is to be inscribed by means 18, flat end 22 of shaft 20 is depressed by a hammer or other implement as illustrated by arrow 52. This will motivate shaft 20 downwardly, and pointed end 50 will inscribe the desired mark in item 26. Spring 46 will return shaft 20 to its original position. Tip 50 can be merely sharply pointed to make an indentation in item 26, or can consist of a writing tip, such as the tip of a ballpoint pen. Shaft 20 can be withdrawn from housing 12 so as to be usable independently as a scribing device, such as for making a mark adjacent indicia 24 on the side of the housing.

The inscribing device 18 can also be manually depressed as illustrated in FIG. 3 so that the apparatus is usable as a compass. One of the tapes such as tape 14 can be extended a selected length as illustrated, and this length can be fixed by various locking means discussed above. The user can then depress shaft 20 with his finger 60 so that housing 12 is pivotable about the pointed lower end of shaft 20. A marking device such as a piece of graphite 62 can be attached to the tab 64 at the end of tape 14. This attachment can be by a magnet, rubber band, or other convenient attachment means. Apparatus 10 is then rotated, the operator using one hand to depress shaft 20 and the other hand to manipulate the tip of tape 14 to inscribe a circular arc 66 as illustrated. Hence, the present invention can be conveniently used to obtain a relatively accurate circular mark, an operation which is quite useful in many construction operations.

The manner in which the apparatus of the present invention can be used to measure contiguous non-co-planar surfaces is illustrated by way of reference to FIG. 4. Here, housing 12 is in abutment with a 90° corner 90 from which emanates planar surfaces 92 and 94. Surfaces 92, 94 could represent the interior surfaces of a window frame, for example. One of the tapes 14 is extended upwardly along surface 92 and the other tape 16 is extended along surface 94. Tape 14 is flexed at the point where it exits opening 34 in housing 12 so that it extends vertically instead of transversely, as illustrated in phantom 96 in FIG. 2. Even metallic tapes are sufficiently flexible so that the 90° bend required can be achieved. Hence, even though the tapes 14, 16 are normally extensible in opposite directions, one or the other or both of the tapes can be angled as illustrated to measure contiguous non-co-planar surfaces.

While a preferred embodiment of the present invention has been illustrated in detail, it is apparent that modifications and adaptations of that invention will occur to those skilled in the art. For example, alternate locking means could be provided rather than the peg locking means or friction locking means described above. However, it is to be expressly understood that such modifications and adaptations are within the spirit and scope of the present invention, as set forth in the following claims.

What is claimed as new is:

1. A two-way measuring and centering device comprising:
   a housing having first and second mutually aligned compartments, said housing having oppositely directed complementary openings in the respective compartments;
   first tape measure means located within the first compartment and having a first tape extensible through the opening in said first compartment in a first direction;
   second tape measure means located within the second compartment and having a second tape extensible through the opening in the second compartment in a second opposite direction independently of the first tape measure means; and
   scribe means projecting through the housing intermediate the first and the second tape measure means, said scribe means including an elongate shaft having a first sharply pointed end and a second opposite generally flat end so that the shaft can be depressed at the flat end to inscribe a mark with the pointed end.

2. A two-way measuring and centering device as recited in claim 1 and additionally comprising bias means adapted to bias the elongate shaft toward the flat end thereof and adapted to normally maintain said shaft in a first raised position, said elongate shaft being returned to said first position by said bias means after being depressed at the flat end to inscribe a mark with the pointed end.

3. A two-way measuring and centering device as recited in claim 1 and additionally comprising a marking tip attachable to the free end of the first tape so that said first tape can be extended a selected length, said scribe means being depressable to provide a pivot point for said first tape measure means and said first tape measure means being rotatable about said pivot point to inscribe an arc of a circle.

4. A two-way measuring and centering device comprising:
- a housing having first and second mutually aligned compartments, said housing having oppositely directed complementary openings, one of the openings being in each of the compartments respectively;
- first tape measure means located in the first compartment and having a first tape extensible through the opening in the first compartment;
- second tape measure means located in the second compartment and having a second tape extensible through the opening in the second compartment independent of the first tape measure means; and
- scribe means projecting through the housing between the first and the second compartments thereof at substantially the exact center of said housing, said scribe means including an elongate shaft having a first pointed end and a second opposite generally flat end, spring bias means biasing said shaft toward the second end thereof and adapted to generally maintain said shaft in a first raised position, said shaft adapted to be depressed at the flat end to motivate said shaft in the direction of the pointed end to inscribe a mark with said pointed end, said shaft being returned to said first position by said spring bias means.

5. A two-way measuring and centering device as recited in claim 4 wherein the first and second tapes include reference numerals aligned in a common direction.

* * * * *